US008872848B1

(12) United States Patent
Appleton

(10) Patent No.: US 8,872,848 B1
(45) Date of Patent: Oct. 28, 2014

(54) RENDERING VECTOR DATA AS TILES

(75) Inventor: Benjamin C. Appleton, Summer Hill (AU)

(73) Assignee: Google Inc., Mountain View, CA (US)

(*) Notice: Subject to any disclaimer, the term of this patent is extended or adjusted under 35 U.S.C. 154(b) by 804 days.

(21) Appl. No.: 12/894,085

(22) Filed: Sep. 29, 2010

(51) Int. Cl.
*G09G 5/22* (2006.01)

(52) U.S. Cl.
USPC .......................................................... 345/629

(58) Field of Classification Search
CPC .................................. G09G 5/14; G09G 5/377
USPC .......................................................... 345/629
See application file for complete search history.

(56) References Cited

U.S. PATENT DOCUMENTS

| 5,030,117 | A * | 7/1991 | Delorme ........................ 434/130 |
| 6,559,853 | B1 * | 5/2003 | Hashimoto et al. ............ 345/582 |
| 6,897,858 | B1 * | 5/2005 | Hashimoto et al. ............ 345/419 |
| 7,259,760 | B1 * | 8/2007 | Hashimoto et al. ............ 345/419 |
| 7,945,569 | B2 * | 5/2011 | Drory et al. ..................... 707/743 |
| 7,948,495 | B1 * | 5/2011 | Nordquist et al. ............. 345/522 |
| 8,155,316 | B1 * | 4/2012 | Riach et al. ..................... 380/240 |
| 8,180,690 | B2 * | 5/2012 | Mayle et al. ................... 705/27.1 |
| 2003/0107572 | A1 * | 6/2003 | Smith et al. ..................... 345/428 |
| 2003/0158916 | A1 * | 8/2003 | Cronin et al. ................... 709/219 |
| 2005/0222978 | A1 * | 10/2005 | Drory et al. ......................... 707/3 |
| 2007/0206016 | A1 * | 9/2007 | Szymanski et al. ............. 345/473 |
| 2007/0206023 | A1 * | 9/2007 | Street et al. ..................... 345/582 |
| 2007/0252834 | A1 * | 11/2007 | Fay ................................. 345/428 |
| 2008/0273218 | A1 * | 11/2008 | Kitora et al. .................. 358/1.13 |
| 2009/0303251 | A1 * | 12/2009 | Balogh et al. .................. 345/632 |
| 2011/0316854 | A1 * | 12/2011 | Vandrovec ..................... 345/420 |
| 2012/0169842 | A1 * | 7/2012 | Chuang et al. ................... 348/39 |
| 2013/0013464 | A1 * | 1/2013 | Mayle et al. .................. 705/27.2 |
| 2013/0066880 | A1 * | 3/2013 | Schramm et al. ............. 707/743 |

OTHER PUBLICATIONS

A Hierarchical Visualization Model of the Global Terrain Based on QTM Bai Jian-jun a, Yan Chao-de b, Zhao Xue-sheng c, Geoinformatics 2008 and Joint Conference on GIS and Built Environment: Geo-Simulation and Virtual GIS Environments.*

* cited by examiner

*Primary Examiner* — Javid A Amini
(74) *Attorney, Agent, or Firm* — Marshall, Gerstein & Borun LLP

(57) ABSTRACT

Methods, systems, and apparatus, including computer programs encoded on a computer storage medium, for rendering vector graphics as multiple tiles in an interactive mapping system. In one aspect, a method includes receiving map data in an interactive mapping system. A set of one or more vertices is that defines a vector graphic is processed, where each vertex defines a map location corresponding to map coordinates. For one or more portions of a vector graphic that coincide with a user viewport, one or more respective vector tiles is generated, where the user viewport defines a first region in which map coordinates can be displayed. On a user command, one or more new vector tiles is rendered at the client device using vertices that coincide with the user viewport at a second region, where the respective new portions did not previously coincide with the user viewport at the first region.

42 Claims, 16 Drawing Sheets

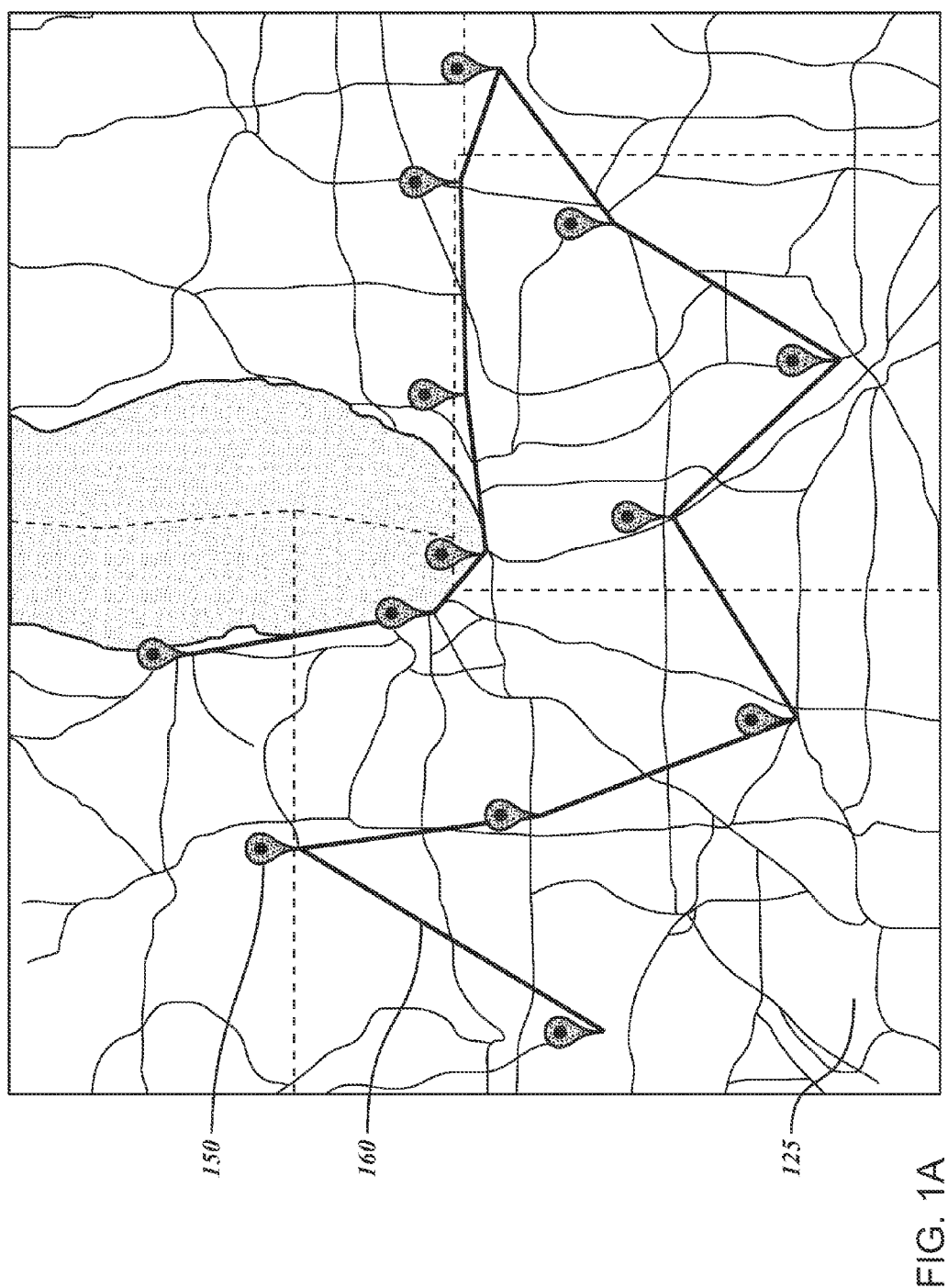

RENDERING VECTOR DATA AS TILES

BACKGROUND

This specification relates generally to rendering vector graphics.

In an interactive mapping system, polygons, polylines, and vector graphics generally can be specified by a collection of vertices, with each vertex representing a map location defined by map coordinates. The resulting vector graphic can be rendered in various ways and is typically composited with an underlying map image.

SUMMARY

This specification describes technologies relating to rendering vector graphics in an interactive mapping system.

In general, vector graphics in an interactive mapping system are rendered by a client device as multiple image tiles. Tiles corresponding to a geographic region visible through a viewport are rendered. When the user initiates a pan command, portions of the vector graphic that come into view are newly rendered as tiles. Previously rendered tiles that are no longer visible within the viewport are released.

In general, one innovative aspect of the subject matter described in this specification can be embodied in methods that include the actions of receiving, at a client device from a server device, map data in an interactive mapping system, processing, at a client device, a set of one or more vertices, where the vertices define a vector graphic, where each vertex defines a map coordinate, for one or more portions of the vector graphic overlapped by a user viewport, generating one or more respective vector tiles at the client device using the vertices, where a vector tile is a portion of the vector graphic, where the user viewport indicates a first range of map coordinates of map data to be composited with the corresponding vector tiles, receiving a command from a user of the interactive mapping system, where the command directs the user viewport to transition from the first range of map coordinates to a second range of map coordinates, and generating one or more new vector tiles at the client device using the vertices for respective new portions of the vector graphic that are overlapped by the user viewport at the second range of map coordinates, where the respective new portions were not previously overlapped by the user viewport at the first range of map coordinates.

Other embodiments of this aspect include corresponding systems, apparatus, and computer programs, configured to perform the actions of the methods, encoded on computer storage devices.

These and other embodiments can each optionally include one or more of the following features. The vector graphic is a polyline, or the vector graphic is a polygon. The polyline is a geodesic polyline. Generating the portions of the vector graphic further comprise computing a level of detail for each vertex and removing vertices that do not meet the level of detail. The level of detail is computed by using a median simplification tolerance. A median simplification tolerance is computed by performing the actions of: for each level of detail, selecting one or more random vertices from one or more vertices remaining in the vector graphic, and for each random vertex, calculating an error value resulting from removing the respective vertex, and selecting a median of the error values as a simplification tolerance. For each vertex remaining in the set of vertices of the vector graphic, the actions further comprise calculating an error value resulting from removing the respective vertex, and removing the vertex from the set of vertices if the error value is less than the simplification tolerance. Geodesic vector graphics are computed by using a recursive bisection procedure. A recursive bisection procedure comprises the actions of: for each edge, computing a linear midpoint of the edge, computing a geodesic midpoint of the edge, rendering the edge as a straight line if the geodesic midpoint is within a predetermined number of pixels of the linear midpoint, and if the geodesic midpoint is not within the predetermined number of pixels of the linear midpoint, introducing the geodesic mid-point as a vertex in the vector graphic.

Particular embodiments of the subject matter described in this specification can be implemented so as to realize one or more of the following advantages. In some implementations, rendering vector data as tiles reduces client processor usage, which can result in a more responsive user interface. Additionally, rendering the vector data as tiles in the client device can save bandwidth by not requiring the server to receive over a network the potentially thousands of vertices of the vector graphic. Furthermore, rendering vector data as tiles in the client device allows rendering all vertices of the vector graphic even where URL data limitations preclude server requests containing all vertices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B show an example of a polyline and a polygon, respectively, in an interface of an interactive mapping system.

DETAILED DESCRIPTION

Interactive mapping systems provide access to vast amounts of map data, particularly when provided in a networked environment, e.g., the Internet. Service providers typically store map data in a distributed storage environment and then serve the map data to client devices over the network.

Client devices can request map data coinciding with a region of interest. The region of interest can be defined by a user viewport, which can be an element of the interactive mapping system interface. The user viewport can have different shapes, e.g., rectangular or square, and can show map data of a particular geographic region.

In response to the request for map data, service providers can send the client device map data, which may be in the form of an image. The client's web browser then displays the map data or image in the user's viewport.

In addition to regular map data, interactive mapping systems may also provide functionality for other graphics to be displayed on top of or composited with the regular map data. Two examples are the vector graphics of polygons and polylines. Vector graphics are specified by vectors of vertices. In particular, with respect to map data, the vertices correspond to map locations, which can be specified by map coordinates. For example, a straight line drawn between two locations can define the edge of a polyline.

A polyline is formed by drawing straight lines connecting successive vertices. A polygon can be formed by drawing a further straight line between the first and last coordinates, thereby forming a closed shape. The inside region of polygons can include visual indicators, e.g., a shading or color, to indicate a particular closed-off region.

These vector graphics can include thousands of vertices. Consequently, rendering these vertices and connecting edges can require significant processing power. In some implementations, a server renders the vector graphics and then serves the rendered image to the client browser.

However, it is not always possible or practical to render vector graphics by the server, particularly when thousands of vertices are chosen or specified by a web browser on the client device, or when the server does not have a mechanism for storing the vertices. When vector graphics are rendered on the client device instead of the server device, the primary cost is in processor usage. If the client device processor is occupied rendering the vector graphic, the user interface of the interactive mapping system may seem slow, jerky, or unresponsive.

Figure 1B:
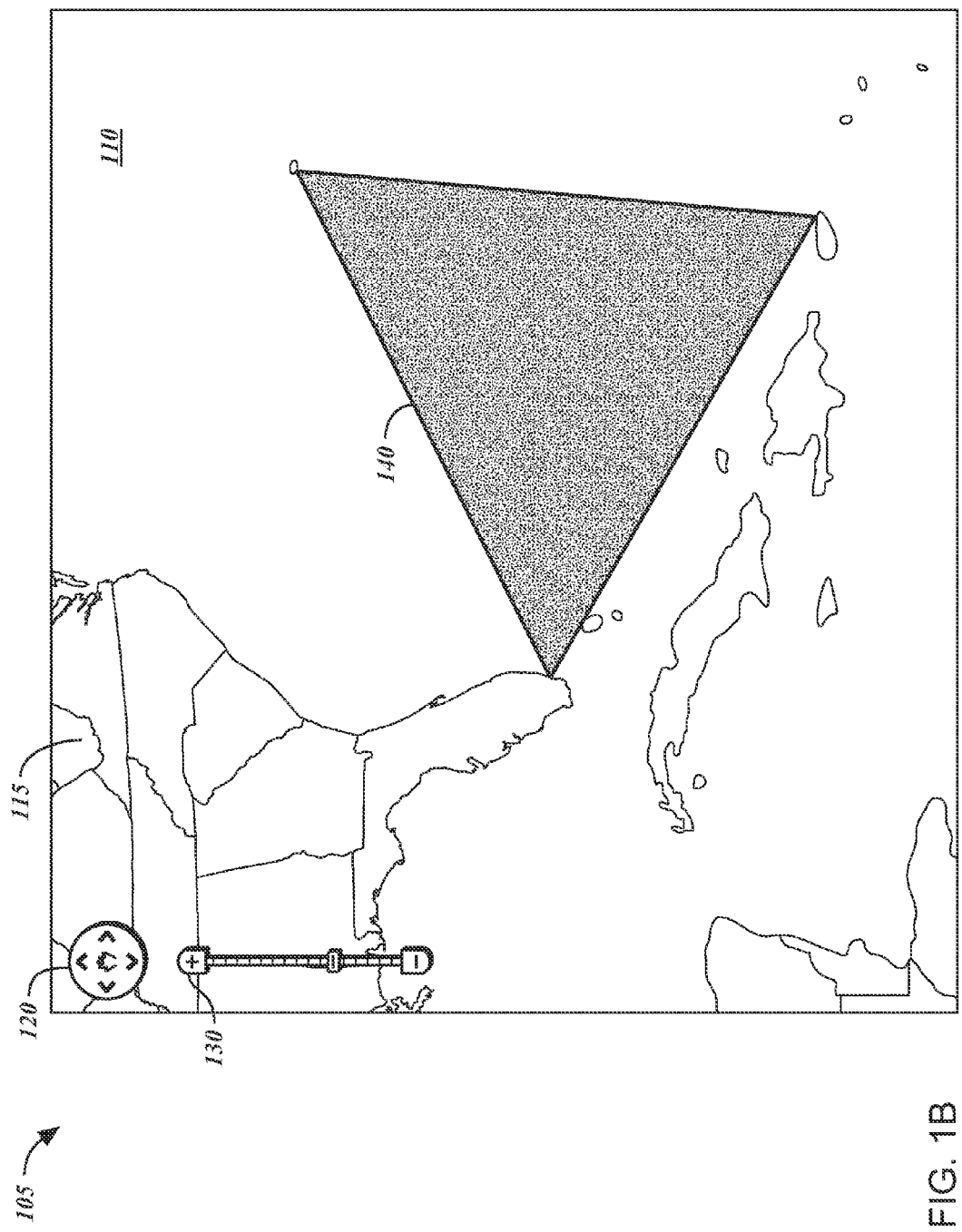

FIGS. 1A and 1B show an example of a polyline and a polygon, respectively, in an interface of an interactive mapping system. These graphics can be simple two-dimensional graphics that are shown composited on top of or merged with the underlying map data.

An interactive mapping interface 105 can contain a background map image 110 showing a map of a portion of the earth's surface. Various different types of map data or aerial imagery can be shown, such as the terrain data 115 or general map data 125.

The interactive mapping interface can include interface elements to control operation of the map, such as a panning control 120, a zoom control 130, a tilt control (not shown), or a rotation control (not shown). In some implementations, the user specifies a pan command by using an input device, e.g., a mouse, to drag the map image. In some other implementations, the user specifies a pan command by dragging a finger across the screen of a touchscreen device.

Some interactive mapping systems provide the functionality to specify vertices of a vector graphic, for example, polygon 140. The user can specify the vertices of the vector graphic, such as vertex 150. During or after specifying the vertices, the vector graphic can be rendered by drawing straight lines 160 between successive vertices. Such straight lines are rendered successively until all edges of the vector graphic have been rendered. In the case of a polygon, e.g., polygon 140 shown in FIG. 1B, the last vertex and first vertex can be joined by an additional straight line in order to close the shape. The inside of the polygon 140 can be shaded to indicate the region inside the polygon 140.

Figure 2:
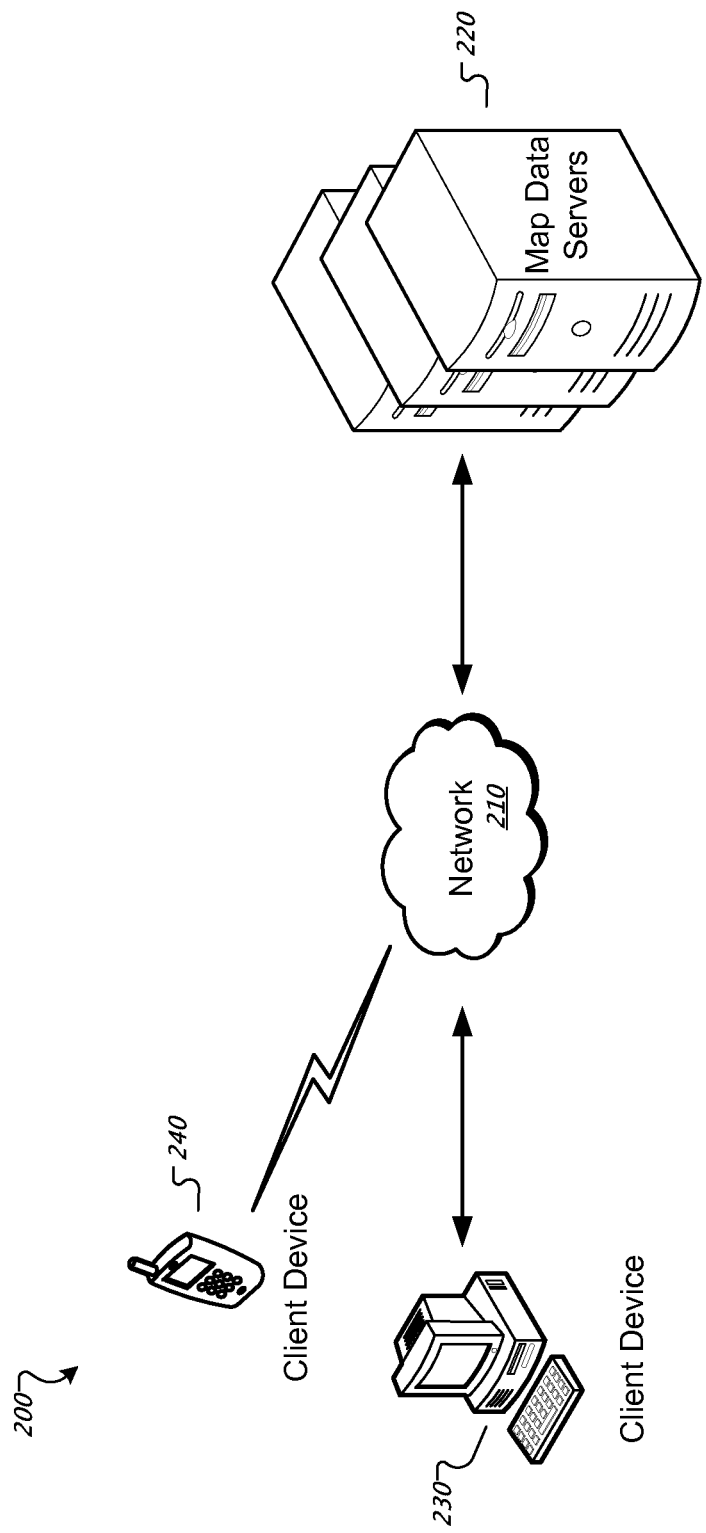
FIG. 2 is an example interactive mapping system.

FIG. 2 is a system overview of an interactive mapping system 200. Client devices 230 and 240 of the interactive mapping system 200 can communicate with one or more map data servers 220 over a computer network 210. The network can be, for example, a wide area network or a local area network.

Map data can be stored on one or more map data servers 220. Map data can be served over the network 210 to the client devices 230 and 240. Map data can include map images, map icons, map labels, terrain images, or satellite images. The client devices 230 and 240 can be any electronic device capable of displaying a map, including but not limited to: personal computer displays (portable or desktop), mobile phones, smart phones, personal digital assistants (PDAs), game consoles, high definition televisions, set-top boxes, navigation systems (e.g., global positioning system (GPS)), avionics displays, or tablet devices.

Figure 3:
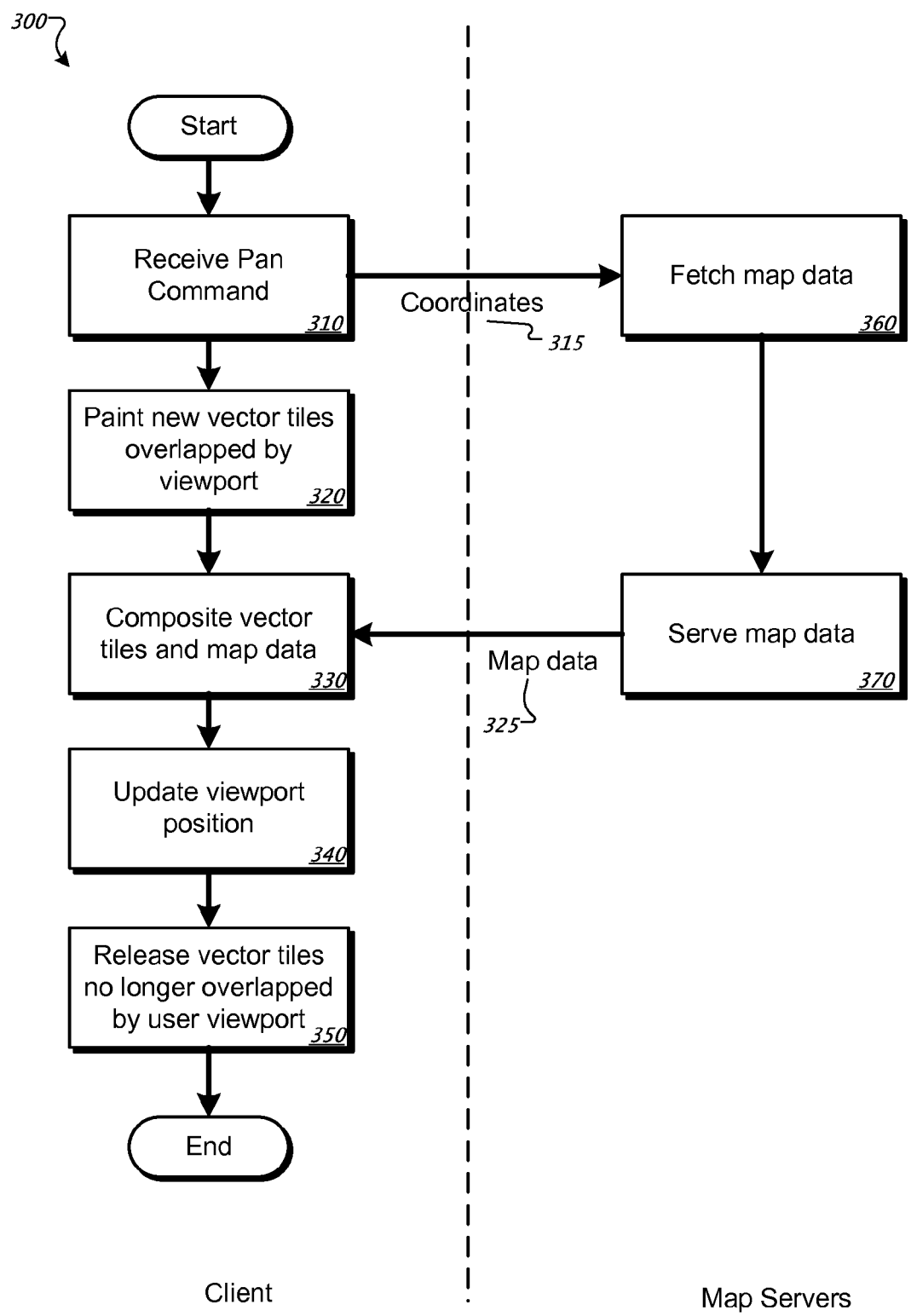
FIG. 3 is a diagram that shows an example of client and server interaction when rendering vector data as tiles in an interactive mapping system.

FIG. 3 is a flow chart of an example process 300 for rendering vector data in an interactive mapping system. A client device can request map data from a map data server (e.g., in response to a user request for particular map data). The client device can use user-specified vertices to render a vector graphic as multiple tiles to be composited or merged with the map data.

At stage 310, the interactive mapping system receives a pan command from a user. The pan command can result in a request for new coordinates 315 from the map data servers. For example, the pan commence can correspond to a user request to transition the user viewport from one region of interest to another. Each region of interest can correspond to a particular range of map coordinates.

In some implementations, the client device, e.g. client device 230 shown in FIG. 2, stores vertices of the vector graphic locally. Thus at stage 320 the client device begins painting new vector tiles intersected or overlapped by new coordinates 315 before getting a response from the map data servers. In some other implementations, the client device waits to paint the new vector tiles until starting to receive map data 325 from the map data servers. In still other implementations, both operations happen in parallel.

At stage 370, map data servers, e.g. map data servers 220 shown in FIG. 2, serve map data 325 corresponding to new coordinates 315 back to the client device.

At stage 330, the client device composites or merges the vector graphic tiles with the map data 325 for output on the client device.

At stage 340, the user viewport position is updated to correspond to the new coordinates 315 indicated by the pan command. The composited map data and vector graphic tiles can be displayed inside the user viewport on the client device. In some implementations, the user viewport position is updated before requesting map data 325 or painting new tiles. In some other implementations, these operations are performed in parallel.

At stage 350, vector graphic tiles that are no longer intersected or overlapped by the user viewport (i.e., no longer in view) are released. In some implementations, releasing a vector graphic tile includes reallocating computer memory locations occupied by the data structure used to implement the vector graphic tile. In some other implementations, the vector graphic tiles are kept in memory but merely not displayed.

Figure 4:
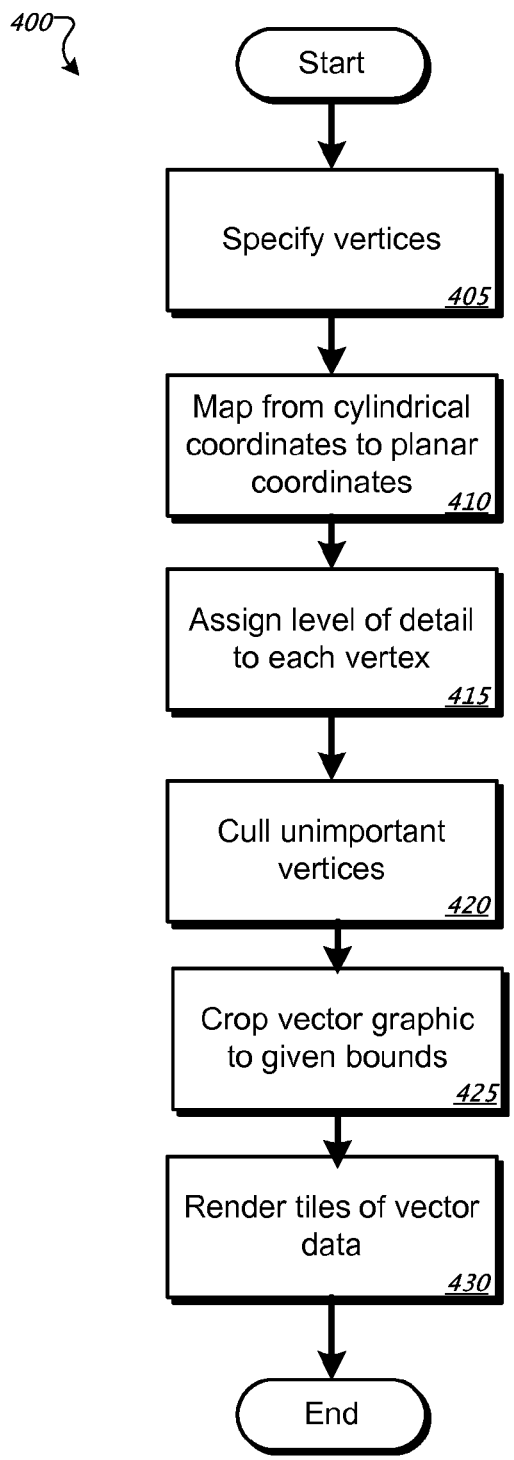
FIG. 4 is a flow chart showing an example rendering process.

FIG. 4 is a flow chart showing an example rendering process 400. The stages of this flow chart are actions that can be taken to render the tiles of a vector graphic given a set of vertices.

At stage 405, the user specifies vertices of the vector graphic. Each vertex can correspond to a map coordinate. The user can specify vertices in various ways. In some implementations, the user can use a mouse to click within the viewport to specify a new vertex. In other implementations, the vertices may be read from a file, which can be, e.g., in vector markup language (VML) format, a scalable vector graphics (SVG) format, or an HTML5 Canvas element format, or any other format suitable for specifying vertices or vector graphics. In some implementations, the vertices can be received over a network (e.g., network 210 shown in FIG. 2).

At stage 410, the vertices are mapped from cylindrical coordinates to planar coordinates. In some implementations, this mapping simplifies the rest of the rendering process for rendering vector graphics. During this stage, some correction operations can be performed for vector graphic edges that cross a longitudinal meridian or International Dateline. This correction might be necessary in order to effectively render such edges that cross a longitudinal meridian as tiles. This process is discussed in more detail with respect to FIG. 11A and FIG. 11B.

At stage 415, a level of detail is assigned to each vertex. The level of detail specifies the minimum zoom level of the interactive mapping system at which it is necessary to render a particular vertex. A vertex below this minimum zoom level can still be rendered, but it may not visibly contribute to the final rendered vector graphic. When the interactive mapping system is zoomed out beyond this level, the vertex can be omitted without a visible change to the final vector graphic. In other words, this can be done to ensure that only vertices that contribute to the final image are rendered. For example, a group of very highly-detailed vertices that are close together on the earth's surface may only appear as a single point when the interactive mapping system is zoomed all the way out. Assigning a level of detail is discussed more thoroughly with respect to FIG. 7.

At stage 420, unimportant vertices are culled. In some implementations, there are no unimportant vertices. In some implementations, unimportant vertices are those vertices that do not visibly modify the vector graphic for the given coordinates of the user viewport and zoom level. Culling unimportant vertices can result in the rendering process skipping over those vertices when rendering the portions of the vector graphic.

At stage 425, the vector graphic is cropped to the bounds defined by the user viewport. In other words, in some implementations the portions of the vector graphic that are not intersected or overlapped by the user viewport can be omitted from the rendering process. In some implementations, cropping is performed to prevent a memory overflow in a rendering buffer. Such buffer overflows could be used to run arbitrary or malicious code on the client device.

In some other implementations, vertices that are not intersected or overlapped by the user viewport remain in the rendering process even if not within the bounds of the user viewport. For example, when rendering a closed vector graphic, e.g., a polygon, edges that are outside the user viewport may be preserved so that the polygon remains properly closed. These edges may be preserved by skipping one or more vertices during the cropping process in stage 425.

At stage 430, the portions of the vector graphic that are intersected or overlapped by the user viewport are rendered as multiple tiles. In some implementations, a tile is a portion of a larger image. A vector graphic tile can be a portion of a larger vector graphic. In some implementations, vector graphic tiles correspond to tiles of map data that make up an underlying map data image. Vector graphic tiles can then be composited on or merged with the underlying map data for display on the client device.

Figure 5:
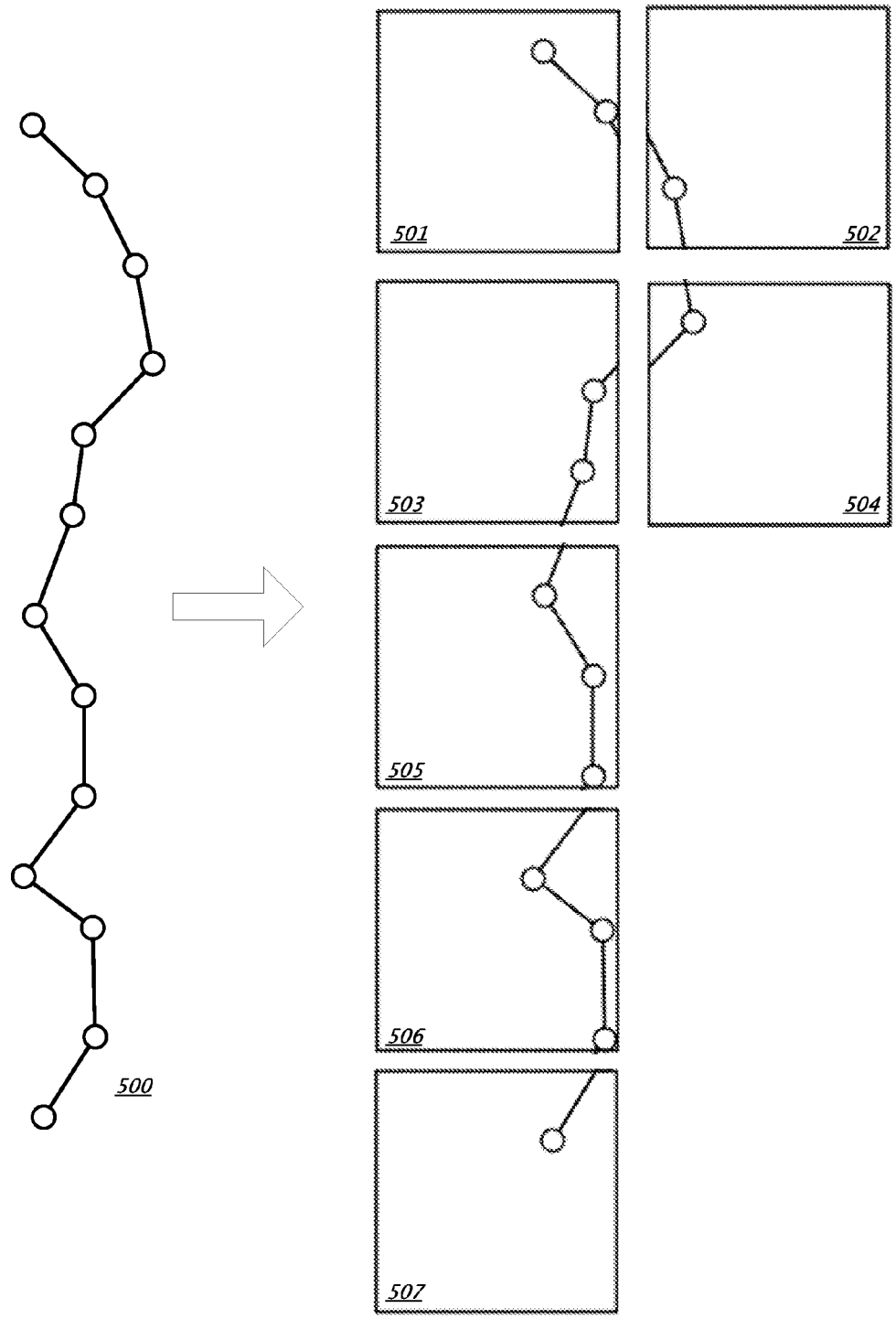
FIG. 5 is a diagram showing a vector graphic being split up into multiple tiles.

FIG. 5 is a diagram showing a vector graphic split up into multiple tiles. By splitting up the vector graphic into multiple times, a client device can render only the tiles that are visible within the user viewport. In some implementations, tiles that are visible within the user viewport are overlapped or intersected by the region defined by the user viewport.

A vector graphic 500 can be split up into multiple tiles 501-507 as shown in FIG. 5. In some implementations, the client device, e.g., the client device 230 shown in FIG. 2, only needs to render the portions of the vector graphic corresponding to tiles that are overlapped by the user viewport. For example, if the user viewport overlaps only tile 504, the client device only renders the portion of the vector graphic in tile 504, rather than the entire vector graphic 500.

Figure 6A:
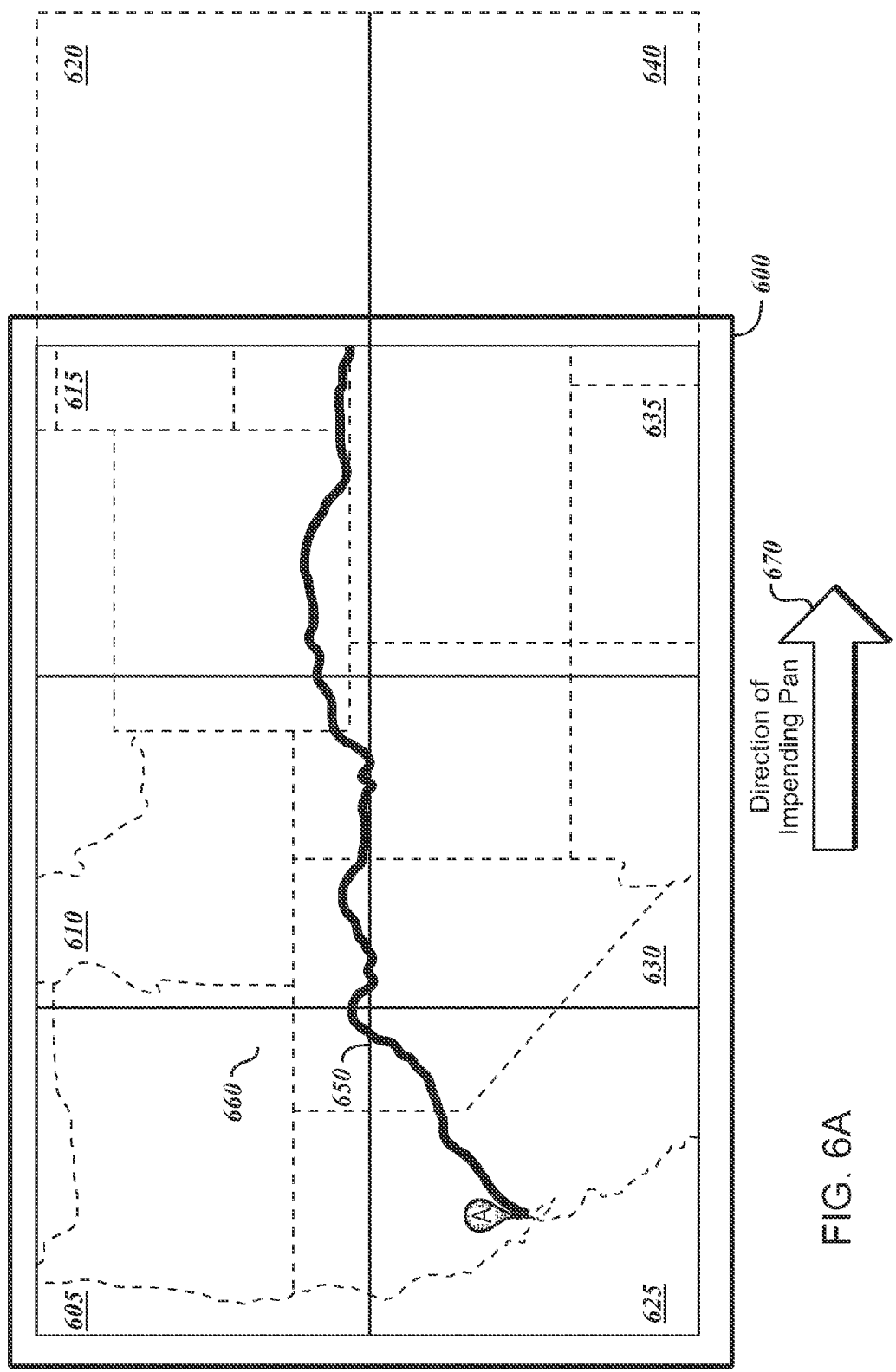
FIGS. 6A and 6B show an example of rendering vector graphic tiles during a pan operation.
Figure 6B:
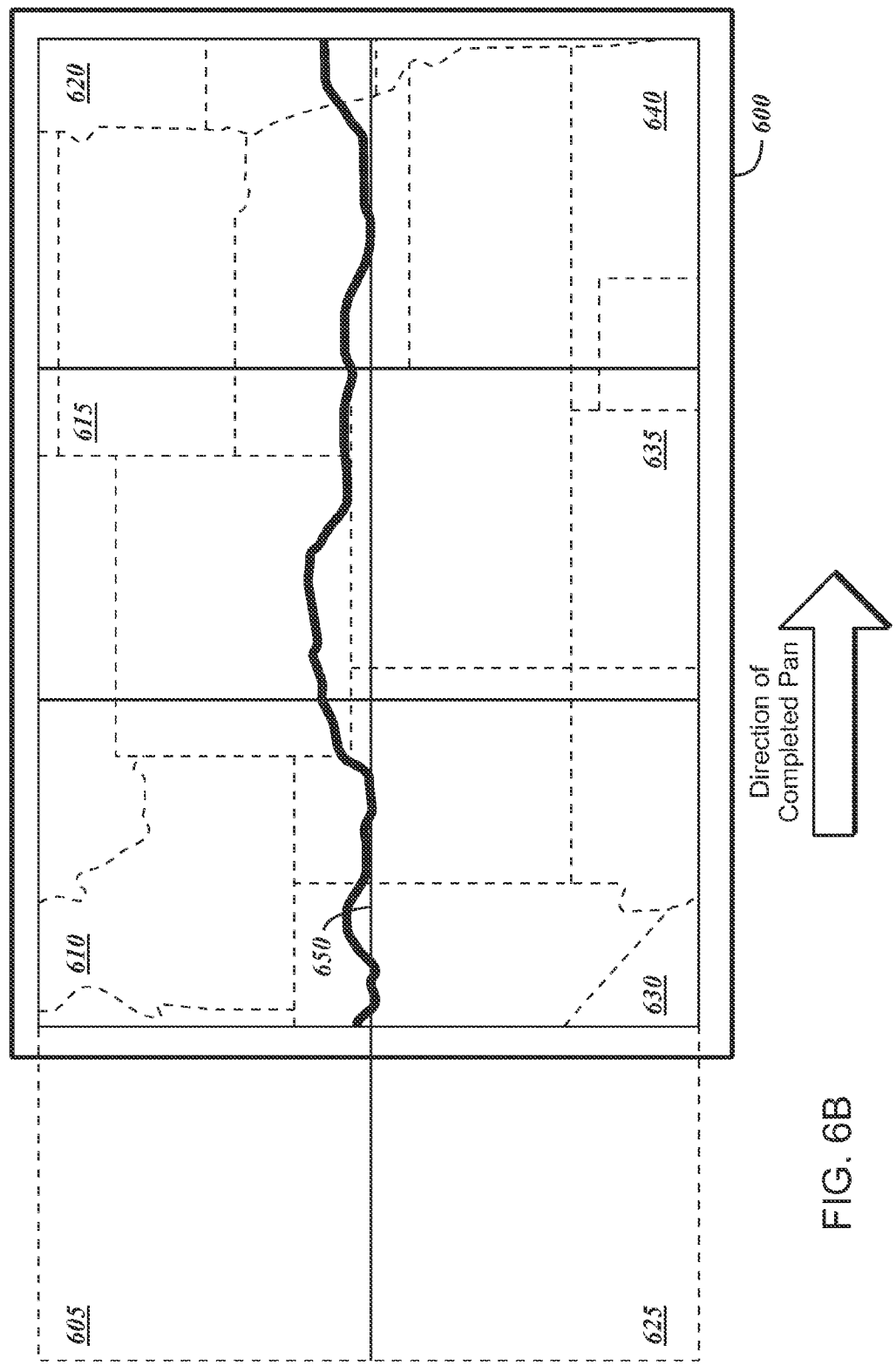

FIGS. 6A and 6B show an example of rendering vector graphic tiles during a pan operation. When the interactive mapping system receives a pan command, vector graphic tiles that come into view can be newly rendered, and vector graphic tiles that fall out of view can be released.

FIG. 6A shows a user viewport 600 that presently overlaps six tiles, e.g. tiles 605, 610, 615, 625, 630, and 635, of vector graphic 650. In this example, the vector graphic 650 is in the form of a polyline, which may show a route between two cities. In this example, portions of the polyline 650 corresponding to tiles 620 and 640 are not overlapped by user viewport 600. Therefore, they may not be rendered yet. In some implementations, the vertices of the polyline that would have fallen in tiles 620 and 640 have been culled, cropped, or both by the rendering process.

Portions of polyline 650 that are overlapped by the viewport 600 can be rendered as tiles 605, 610, 615, 625, 630, and 635. These vector graphic tiles can then be composited on top of general map data 660.

In some implementations, the rendering of the polyline 650 is not limited to the bounds of the user viewport 600. The tiles of the polyline 650 can instead be padded by a few tiles in either direction of the viewable bounds of user viewport 600.

The arrow 670 indicates a panning direction in response to a pan command that can be received from a user of the interactive mapping system. In this example, user viewport 600 has received a pan command to transition from the present coordinates to those corresponding to the user viewport in FIG. 6B.

As described above with respect to FIG. 3, after receiving a pan command, the client device can initiate a request to the map data servers for map data corresponding to the new position of the user viewport. In some implementations, the client device already has the vertices of the polyline stored locally and can therefore render new portions of the polyline 650 without waiting for a reply from the map data servers.

FIG. 6B shows user viewport 600 overlapping a new set of coordinates. The user viewport in FIG. 6B now overlaps tiles 610, 615, 620, 630, 635, and 640. In this example, tiles 605 and 625 are no longer overlapped by the user viewport 600.

In some implementations, portions of the polyline 650 corresponding to tiles 620 and 640 were rendered as tiles when those portions came into view by being overlapped by the user viewport.

In some implementations, the vector graphic tiles 605 and 625 were released when these tiles were no longer overlapped by the user viewport 600. Being released can mean that the local volatile or non-volatile memory allocated to store these tiles in the client device is freed or erased. In other implementations, being released simply means that the tiles are no longer displayed on the screen. In other implementations, the vector graphic tiles are not displayed on the screen but are stored in a local cache.

In some implementations, vertices corresponding to tiles 605 and 625 were culled, cropped, or both during the process of rendering vector graphic 650 as tiles.

Figure 7:
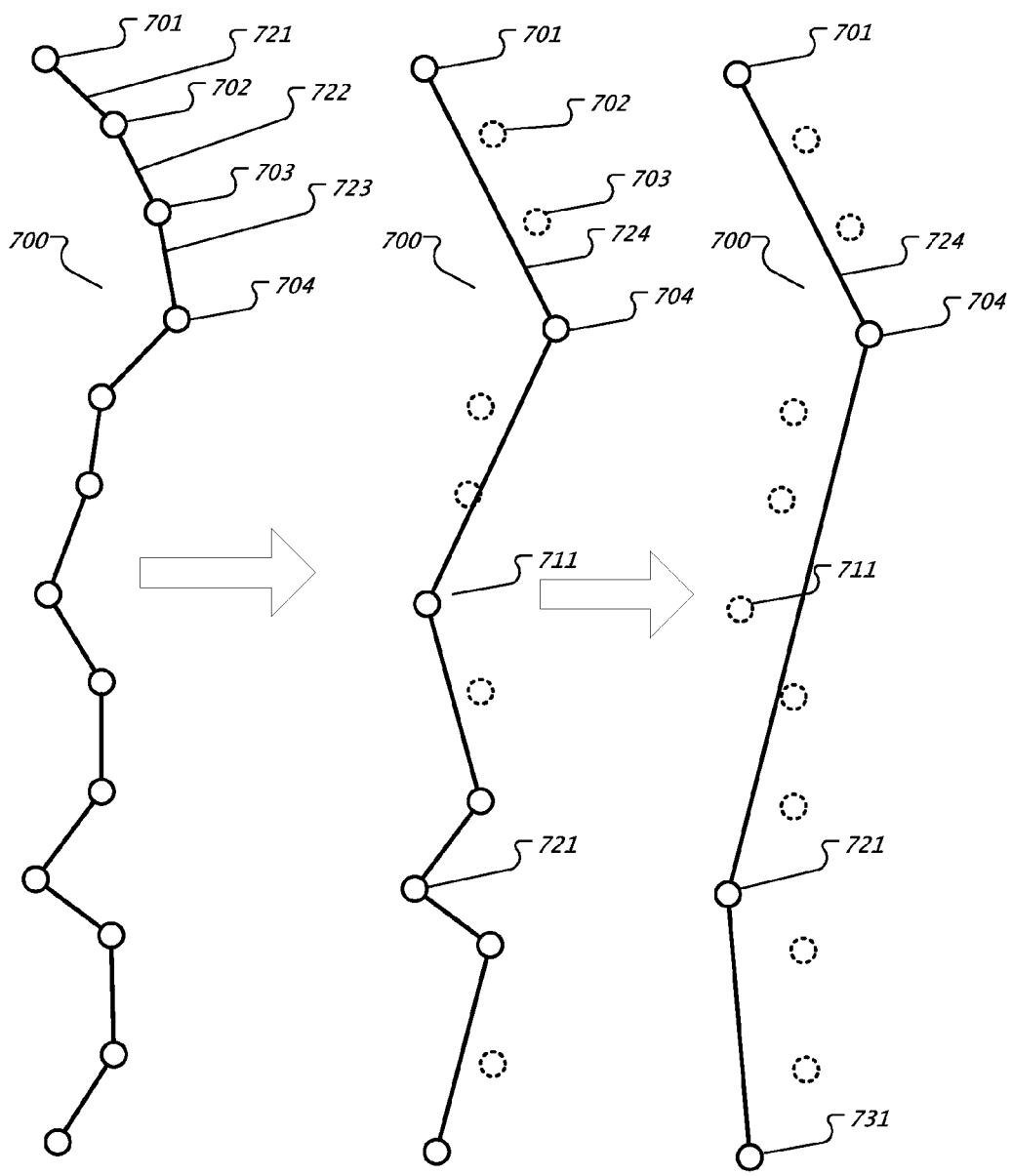
FIG. 7 is a diagram showing example level of detail assignment to vertices.

FIG. 7 is a diagram showing example level of detail assignment to vertices. A level of detail is assigned to vertices so that unimportant vertices can be culled during the rendering process. Unimportant vertices are those that do not visibly contribute to the vector graphic at particular levels of detail. Culling vertices during the rendering process may reduce the time needed to render a vector graphic tile.

The vector graphic used as an example in FIG. 7 is a polyline. Polyline 700 includes multiple vertices, for example, vertex 701. At the highest level of detail, polyline 700 can be drawn with every vertex contributing to the final rendered vector graphic. In some implementations, the highest level of detail corresponds to the most zoomed-in level of the interactive mapping system.

In some implementations, if all vertices contribute to the final vector graphic, an edge, e.g. edge 721, is drawn between each successive vertex. In this example, because all vertices of polyline 700 contribute to the vector graphic, an edge is drawn between each successive vertex.

In some implementations, all vertices can contribute to the final vector graphic at all zoom levels. However, at some zoom levels, all vertices are not necessary to display the polyline such that one or more of the vertices can be removed from the rendered polyline. The assigned level of detail can be used to determine which vertices are unimportant and can be removed from the rendering process.

The level of detail process can assign a level of detail to each vertex. If the zoom level of the interactive mapping system is beyond that level of detail, that vertex can be effectively skipped and does not contribute to the final vector graphic. If, however, the user zooms in to a higher level of detail, the vertex removed may again contribute to the final vector graphic.

For example, in polyline 700, the level of detail assignment may assign a level of detail to each vertex such that every vertex contributes to the final vector graphic at zoom level 3. Therefore, all vertices of polyline 700 can have a level of detail assignment of 3 or higher.

In some implementations, if the user zooms out and the zoom level changes from 3 to 2, the rendering process will check to determine which vertices should contribute to the final vector graphic. In this example, vertex 702 has been assigned a level of detail of 3. However, in this example, for polyline 700 at a zoom level equal to 2, the vertex 702 is culled from the rendering process because its level of detail is less than the current zoom level. Similarly, vertex 703 has been culled from the rendering process because it may have a level of detail of 3, but the zoom level is 2. As a result, instead of three edges 721, 722, and 723 being rendered respectively between vertices 701 and 702, 702 and 703, and 703 and 704, respectively, there may be only a single edge 724 rendered between vertices 701 and 704.

In some implementations, the relationship between the level of detail and zoom level varies. The vertices may be culled if the zoom level is less than, less than or equal to, greater than, or greater than or equal to, or strictly equal to the level of detail assignment.

In this example, at zoom level 1, more vertices can be culled, e.g., vertex 711. Thus, at zoom level 1 only three edges are drawn between vertex 701 and vertex 704, between vertex 704 and vertex 721, and between vertex 721 and vertex 731.

Figure 8:
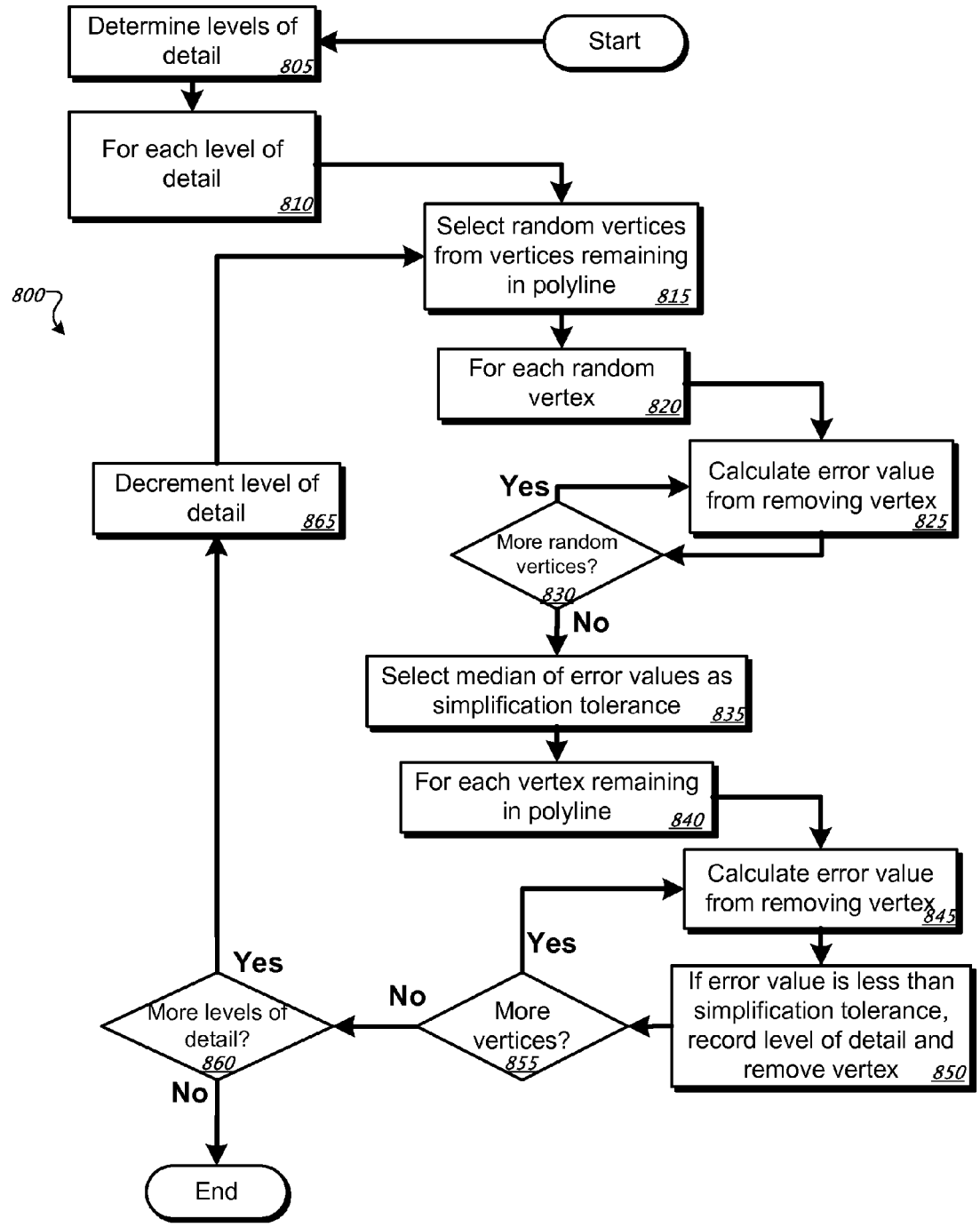
FIG. 8 is a flow chart of an example level of detail assignment process.

FIG. 8 is a flow chart of an example level of detail assignment process 800. Level of detail assignment can determine which vertices are unimportant and do not visibly contribute to the final vector graphic.

At stage 805, the process for assigning levels of detail to each vertex of a vector graphic to be rendered begins. In some implementations, the level of detail is assigned once when the vertices of the vector graphic are defined.

One potential process for calculating a level of detail for vertices in a vector graphic uses a median simplification tolerance. This technique first randomly chooses a number of vertices from the vector graphic. For each respective vertex, an error that results from removing that respective vertex from the rendering process is calculated. In some implementations, the error is calculated by measuring the distance between an edge rendered with the vertex included and an edge rendered with the vertex excluded. After calculating the error for the random sampling of vectors, the median of the calculated error values is used as a simplification tolerance. In general, using a median as the simplification tolerance can ensure that roughly half the vertices are removed at each successive level of detail.

At stage 810, each level of detail is determined. In some implementations, the number of levels of details is equal to the number of zoom levels supported by the interactive mapping system. In some other implementations, the number of levels of detail is fewer than the number of zoom levels because the difference in the vector graphic between some zoom levels can be small enough not to effect the rendered edges.

At stage 815, one or more vertices from those remaining in the vector graphic are randomly selected.

At stage 820, an error value is calculated for each of the randomly chosen vertices that would result from removing that vertex from the rendering process.

At stage 830, if error values for any of the randomly selected vertices have not been calculated, the process returns to stage 825 to calculate the error value from removing the next vertex among the randomly selected set of vertices. If no more randomly selected vertices remain, the process continues to stage 835.

At stage 835, the median of all error values calculated from the random set of vertices is selected as a simplification tolerance. In some implementations, a simplification tolerance is a value that indicates an acceptable simplification of the vector graphic resulting in removing certain vertices. This value can be used to determine which vertices are actually removed from the vector graphic rendering process at the current level of detail.

At stage 840, an error value is calculated for each of the remaining vertices in the vector graphic. In some implementations, this includes the set of randomly selected vertices selected at stage 815. In other implementations, because the error values have already been calculated for the randomly selected vertices, these vertices are not included in these calculations.

At stage 845, the error value resulting from removing the vertex from the rendering process is calculated. In this stage, calculating the error value can be performed to determine whether or not to remove the vertex according to the chosen simplification tolerance. This is in contrast to stage 825 where the error value is calculated to determine the simplification tolerance initially.

At stage 850, the calculated error value is compared to the chosen simplification tolerance. If the error value is less than or equal to the simplification tolerance, the vertex is removed from the vector rendering process at this particular level of detail. If the error value is greater than the simplification tolerance, the vertex is not removed from the vector rendering process at this particular level of detail.

In some implementations, "removing" a vertex means assigning it a level of detail equal to the current level of detail. In some other implementations, removing a vertex means removing the vertex from the rendering process. In some cases, once a vertex is assigned a level of detail or removed from the vector rendering process, the vertex need not be considered again on the next level of detail iteration because it has already been assigned a level of detail or removed from the process.

At stage 855, if vertices remain that have not had error values calculated, the process returns to stage 845 to calculate the next error value. If no more vertices remain, the process continues to stage 860.

At stage 860, the number of levels of detail remaining is determined. In some implementations, a level of detail for each zoom level supported by the interactive mapping system is determined. In other implementations, fewer levels of detail than zoom levels of the interactive mapping system are determined.

If more levels of detail remain to be determined, the current level of detail is decremented at stage 865 and the process returns to stage 815 to select a new simplification tolerance for the new level of detail. In some implementations, the level of detail is successively incremented rather than decremented.

If no more levels of detail remain to be determined, the process ends.

Figure 9:
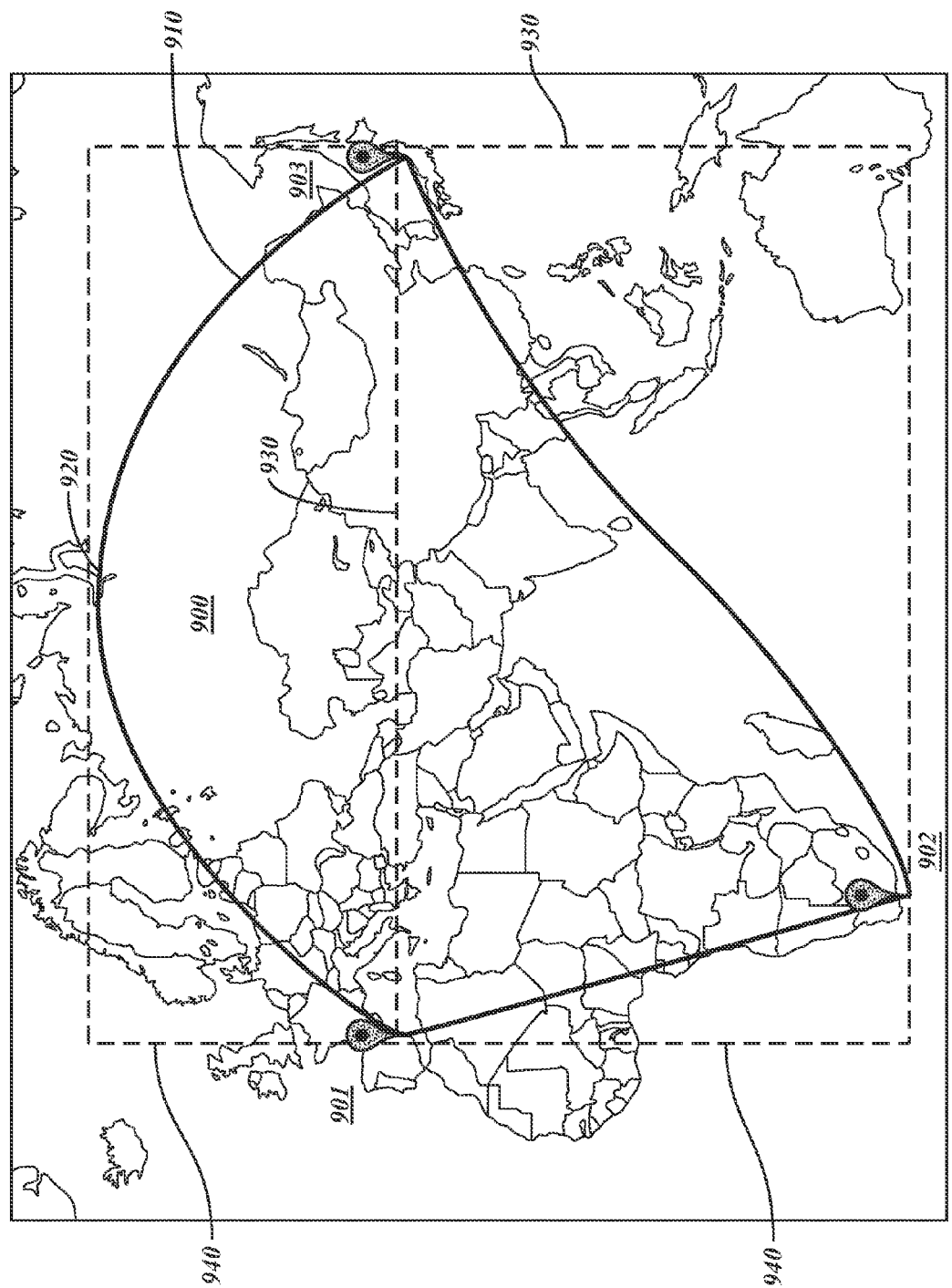
FIG. 9 is a diagram of an example geodesic polygon.

FIG. 9 is a diagram of an example geodesic polygon. Geodesic curves follow the shortest path between two points on the curved surface of the Earth. In other words, they follow a great circle route rather than a straight line drawn in cylindrical or planar coordinates of many interactive mapping system projections. A great circle route can be an arc on a sphere that divides the sphere into two hemispheres of equal size.

Polygon 900 has three vertices 901, 902, and 903. In this example, the edges connecting the polygon have been rendered as geodesic curves, which can follow the shortest path along the curved surface of the Earth between to vertices. Edge 910 can, for example, represent the shortest distance between Spain and Japan on the curved surface of the earth.

In some implementations, there is little difference between a geodesic edge and a straight line. For example, the edge between vertex 901 and vertex 902 is a geodesic curve, but has little noticeable difference between a straight line.

In some implementations, additional vertices are added to a geodesic vector graphic so that the geodesic edges are contained within the bounding box of the vector graphic. An additional vertex can be added at the northernmost or southernmost point of the geodesic curve, depending on which region of the curve is outside the bounding box of the vector graphic.

In FIG. 9, the vector graphic would be entirely contained within the bounding box 930 if it were not a geodesic vector graphic. In order for the entire vector graphic to be contained within a bounding box, an additional vertex can be added at the northernmost point 920 of the geodesic curve 910. In some implementations, this additional vertex defines a new bounding box 940 that contains the entire geodesic vector graphic. This can be done to correctly determine which geodesic edges are outside the user viewport and which geodesic edges overlap or intersect the user viewport.

Figure 10:
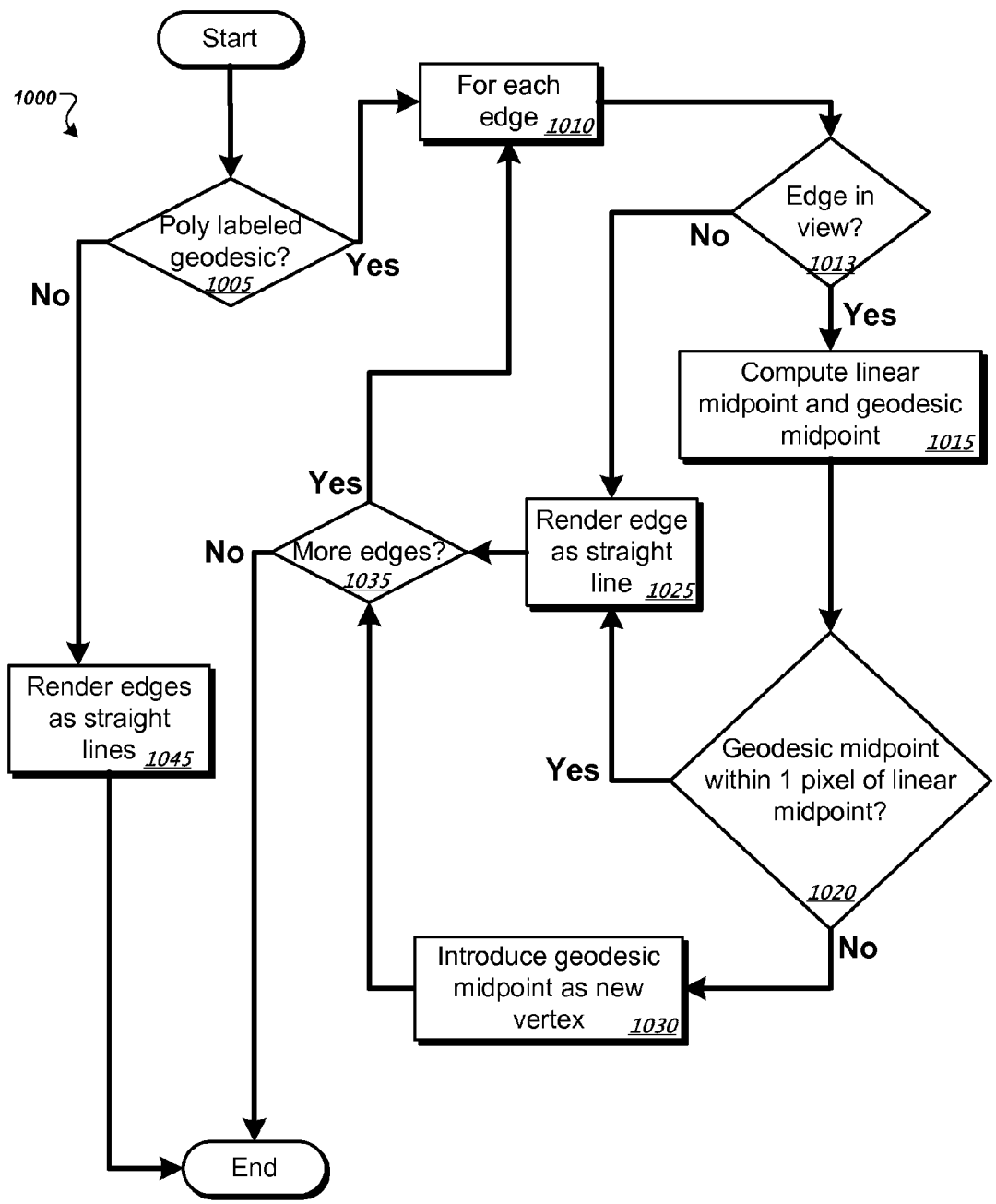
FIG. 10 is a flow chart of an example process for rendering geodesic curves with a recursive bisection algorithm.

FIG. 10 is a flowchart of an example process for rendering geodesic curves with a recursive bisection algorithm. Vector graphics can be specified by a set of vertices, and vector graphics can be rendered by drawing straight lines between the vertices. In the case of an interactive mapping system drawing the edges of a vector graphic as geodesic curves, the system can determine new vertices that can be inserted along the geodesic path so that the geodesic path can also be rendered as a vector graphic by drawing straight lines along a set of vertices.

At stage 1005, if the vector graphic ("poly") is not a geodesic curve, the process proceeds to stage 1045 so that its edges are rendered as a series of straight lines. The process can then end. In some implementations, only a portion of the vector graphic will be rendered with geodesic curves. The remainder of the vector graphic can be rendered as a series of straight lines. If the vector graphic is a geodesic curve, the process continues to stage 1010.

At stage 1010, each edge of the vector graphic is rendered as a geodesic curve. In some implementations, a geodesic curve is rendered by multiple smaller straight lines such that the finished vector graphic only appears to be a curve to the user. Therefore, in some implementations the task of rendering a geodesic curve includes determining new vertices of the vector graphic, the edges of which are rendered as straight lines.

At stage 1013, whether the geodesic edge is in view is determined. In some implementations, a geodesic edge is in view if it is overlapped or intersected by the user viewport. Determining whether a geodesic edge is in view can require inserting one or more additional vertices located along the geodesic curve so that the bounding box defined by the vertices contains the entire vector graphic. These additional vertices can be added so that the bounding boxes of the vector graphic also contain the entire geodesic curve.

If the geodesic curve is not in view, it is rendered as a straight line at stage 1025. If the geodesic curve is in view, the process continues to stage 1015. As described above with respect to FIG. 4, edges that are out of view may be rendered in order to preserve the correct closure of a closed vector graphic, e.g. a polygon.

At stage 1015, the linear midpoint and geodesic midpoint of the curve are computed. The linear midpoint can be the midpoint on a straight line drawn between two vertices in planar, cylindrical, or other coordinate system. The geodesic midpoint can be the midpoint on a geodesic curve between two vertices. Both the linear midpoint and geodesic midpoints can represent a single map coordinate.

At stage 1020, the distance between the geodesic midpoint and linear midpoint is determined. Any distance measure can be used to calculate this distance. In some implementations, because the process can be carried to draw a series of straight lines that appear to be a curve to the user, the distance is a single pixel. In some implementations, a single pixel suffices as the distance threshold because the client device is incapable of rendering more detail than a single pixel.

At stage 1025, if the geodesic midpoint and linear midpoint were within a distance threshold of one pixel, the edge between the vertices is rendered as a straight line.

At stage 1030, if the linear midpoint and geodesic midpoint were not within the threshold distance of one pixel, the geodesic midpoint is introduced as a new vertex in the vector graphic. In some implementations, the geodesic midpoint is introduced by adding its corresponding map coordinates to the set of vertices of the vector graphic.

At stage 1035, remaining unrendered edges of the vector graphic are determined. If edges remain to be rendered, the process returns to stage 1010.

If stage 1035 is reached after stage 1030, in some implementations the introduction of the geodesic midpoint as a new vertex indicates that two new edges are to be drawn. If there are more edges to be drawn, the process returns to stage 1010 to render the remaining edges of the vector graphic.

In some implementations, the logic of stage 1035 is a recursive function rather than an iterative function. A recursive function can be a computer process that is self-referential and can involve processing steps that wait for further self-invoked instances of the same function complete. A recursive function can simplify the logic of step 1035. The same or similar steps as an iterative function can be performed, however. For example, a computer process could perform these steps by a function that makes calls to itself to render the vertices of the geodesic curve.

At stage 1035, if no edges remain to be rendered, the process ends.

Figure 11A:
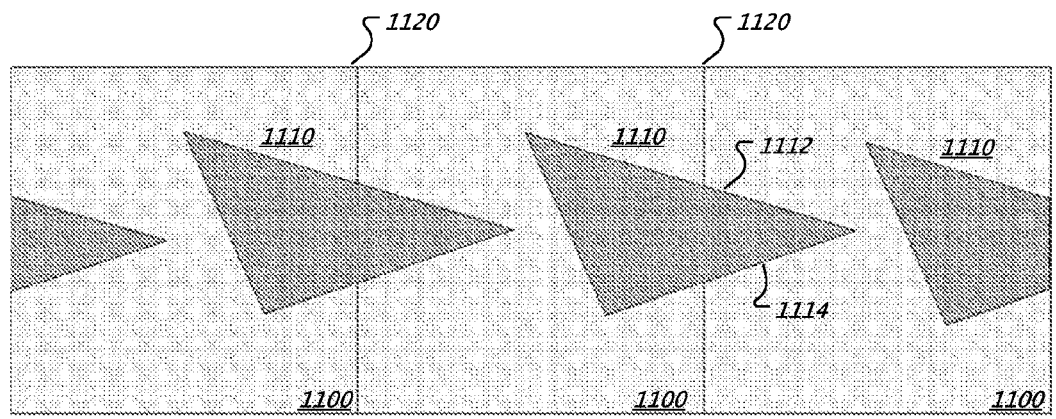
FIGS. 11A and 11B are diagrams showing an example of rendering a vector graphic as a tile when its edges cross a longitudinal meridian.
Figure 11B:
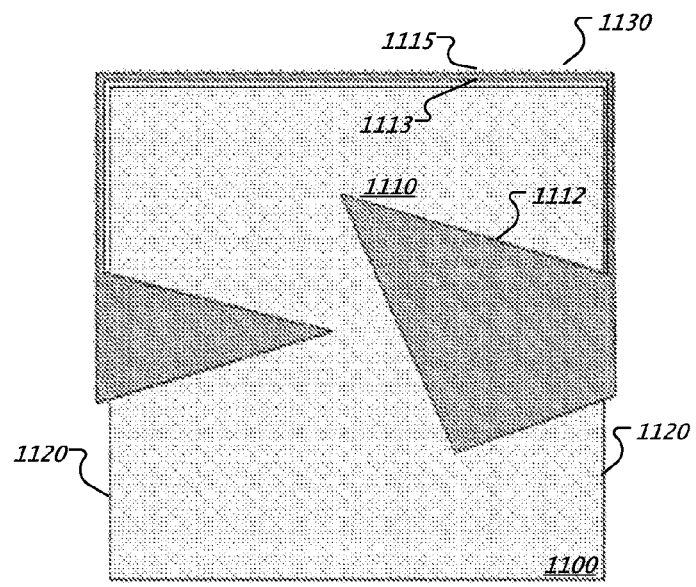

FIGS. 11A and 11B are diagrams showing an example of rendering a vector graphic as a tile when its edges cross a longitudinal meridian. This can ensure that polygons that wrap the globe can be rendered as one or more tiles. Because polygons define a closed area, edges that wrap the globe may erroneously introduce or remove holes in the polygon when rendered as one or more tiles.

FIG. 11A shows a polygon 1110 that has been rendered in a single canonical world tile 1100, which can be a tile containing the entirety of the Earth's surface. In FIG. 11A, the canonical world tile can be repeated to the left or right one or more times. In this example, the polygon 1110 contains two edges 1112 and 1114 that cross longitudinal meridian 1120.

FIG. 11B shows an example implementation that can ensure that polygon 1110 can be correctly rendered as a tile in the canonical world tile 1100. In this example, edge 1112 has been modified so that its two parts on either side of the longitudinal meridian 1120 are connected by a series of edges 1113. The series of edges 1113 can take a path outside the boundary of the canonical world tile 1100. Similarly, edge 1114 can be modified so that its two parts on either side of the longitudinal meridian 1120 are connected by a series of edges 1115.

After the polygon 1110 has been modified with the two series of edges 1113 and 1115 that follow a path outside the boundary of the canonical world tile 1100 as shown in FIG. 11B, it can be correctly rendered as a tile without changing its topology. In other words, the polygon 1110 can be correctly rendered as a tile in the canonical world tile 1100 without erroneously introducing or removing holes.

After the polygon 1110 has been correctly rendered as a tile in the canonical world tile 1100, the canonical 1100 world tile can be cropped to the bounds of the user viewport. The canonical world tile 1100 can also be duplicated to the left or right to form the finished rendered vector graphic as shown in FIG. 11A.

Figure 12:
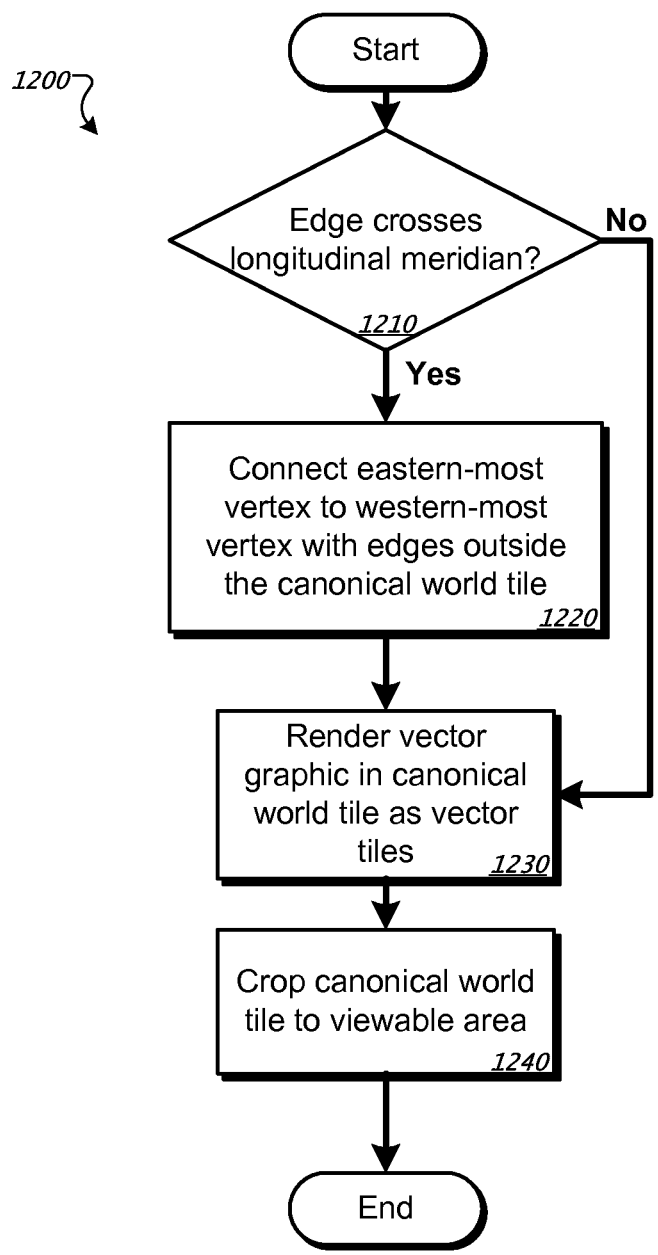
FIG. 12 is a flow chart showing an example process for rendering a vector graphic as a tile when an edge of the vector graphic crosses the longitudinal meridian.

FIG. 12 is a flow chart of an example process 1200 for rendering a vector graphic as a tile when an edge of the vector graphic crosses the longitudinal meridian.

At stage 1210, the process determines whether any edges in the vector graphic cross the longitudinal meridian. If no edges cross the longitudinal meridian, the process 1200 can proceed to stage 1230 to render the vector graphic in the canonical world tile.

At stage 1220, if an edge of the vector graphic crosses the longitudinal meridian, a new series of edges is introduced to ensure that the vector graphic renders correctly as a tile. The process can connect the eastern-most edge of the vector graphic to the western-most edge of the vector graphic with a series of edges outside the boundary of the canonical world tile.

At stage 1230, the vector graphic is rendered as one or more tiles in the canonical world tile.

At stage 1240, the canonical world tile is cropped to the viewable boundary so that the system does not display the edges that are outside the boundary of the canonical world tile.

Figure 13:
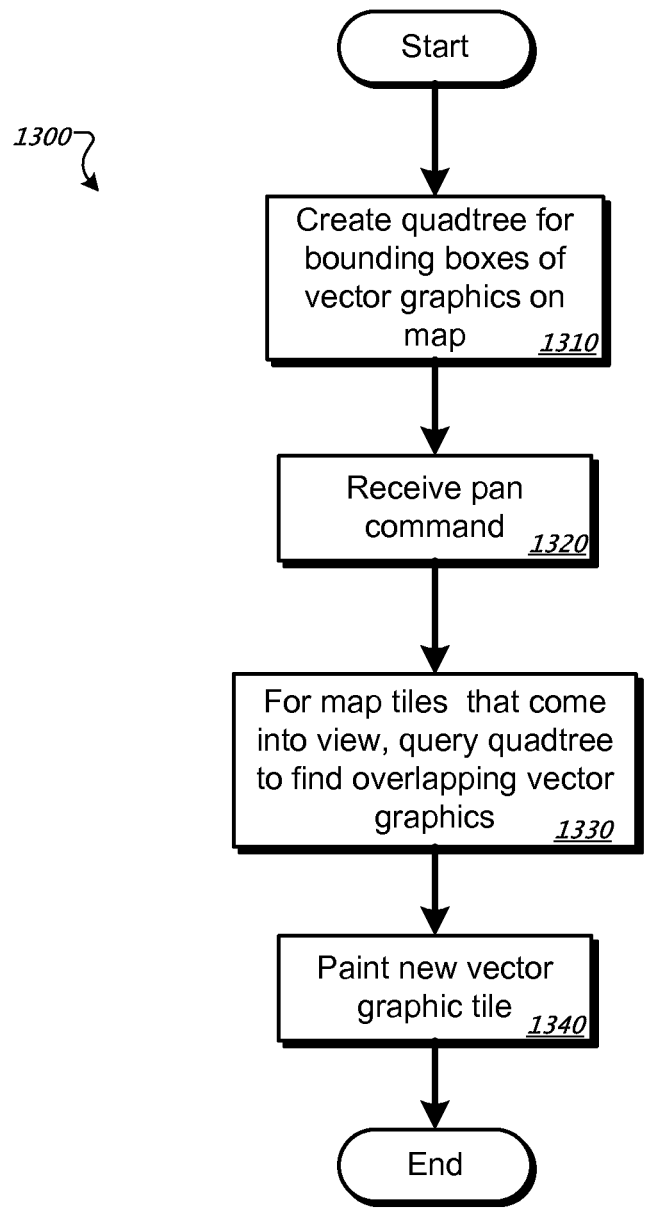
FIG. 13 is a flow chart showing an example process for efficiently locating vector graphics that come into view on a pan command.

FIG. 13 is a flow chart of an example process 1300 for efficiently locating vector graphics that come into view on a pan command. A quadtree of bounding boxes of vector graphics can be used to efficiently determine vector graphics that intersect each map tile. In other words, this quadtree can ensure that the system quickly skips over vector graphics that are not in view.

At stage 1310, a quadtree is created and indexed with the bounding boxes of vector graphics specified at the client device. Each bounding box can indicate the outer limits of a vector graphic, an edge, or a vertex. In some implementations, the quadtree indexes a collection of bounding box/vector graphic pairs.

At stage 1320, the process receives a pan command. The pan command may cause additional map tiles containing map data to become overlapped or intersected by the user viewport, and therefore to come into view.

At stage 1330, for these new additional map tiles, the quadtree of vector graphic bounding boxes can be queried or traversed to identify vector graphics that overlap the new map tiles. In some implementations, querying the quadtree of vector graphics requires inputting a bounding box of a new map tile. The result of the quadtree query will be a set of vector graphics that overlap or intersect the bounding box of the new map tile.

At stage 1340, the set of vector graphic tiles that overlap or intersect the new map tiles can be rendered and composited with their respective map tiles containing map data.

Figure 14:
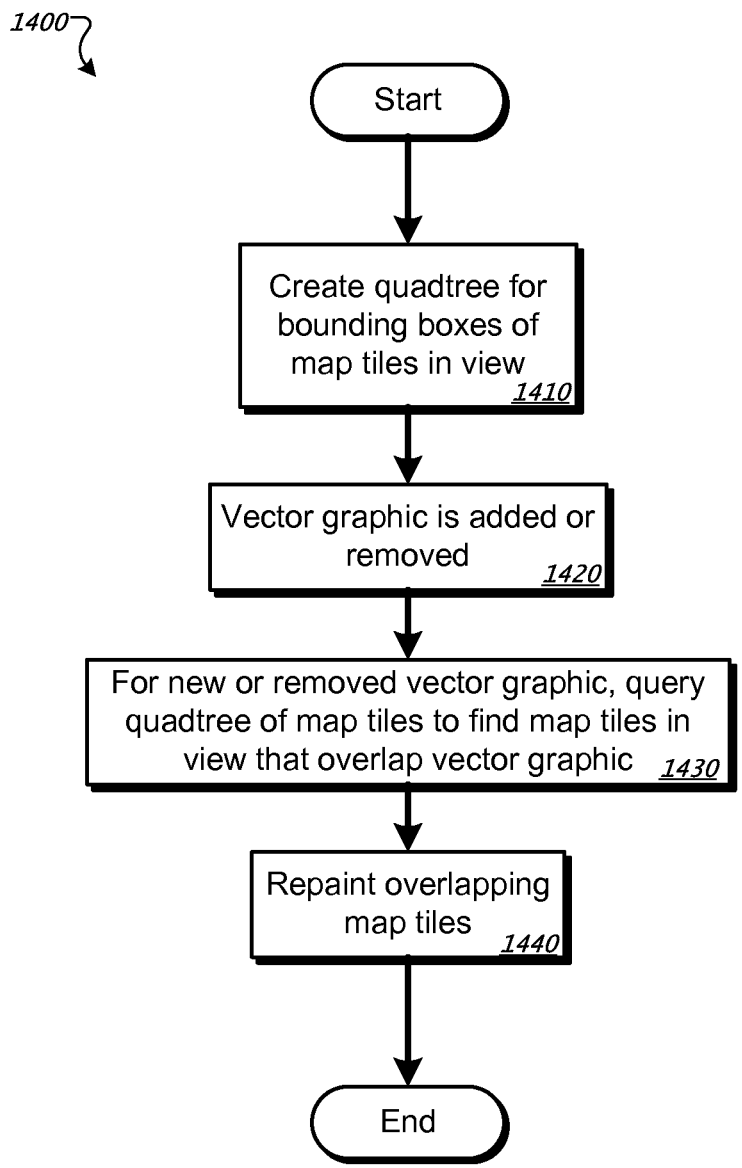
FIG. 14 is a flow chart showing an example process for efficiently locating map tiles that are overlapped by a new vector graphic.

FIG. 14 is a flow chart of an example process 1400 for efficiently locating map tiles that are overlapped by a new vector graphic. By using a quadtree of bounding boxes of map tiles, the system can efficiently determine map tiles that intersect or are overlapped by new or removed vector graphics.

At stage 1410, a quadtree is created and indexed with the bounding boxes of map tiles containing map data that are currently in view. A bounding box can indicate the outer limits of the map tile. In some implementations, the quadtree indexes a collection of bounding box/map tile pairs.

At stage 1420, a user can add or remove a vector graphic at the client device. For example, a user of the client device can add a vertex by clicking the interface of the interactive mapping system. Or a user can instruct the interface of the interactive mapping system to read a file containing of vertex information.

At stage 1430, for one or more new vector graphics, the quadtree of bounding boxes of map tiles in view is queried or traversed to identify map tiles that overlap the new or removed vector graphic. In some implementations, querying the quadtree of map tiles in view requires inputting a bounding box of the new or removed vector graphic. The result of the quadtree query will be a set of map tiles in view that overlap or intersect the bounding box of the new or removed vector graphic.

At stage 1440, the vector graphic tiles are rendered and combined (e.g., composited or merged) with the map tiles of map data in the case of a vector graphic being added. In the case of a vector graphic being removed, the map tiles of map data can be repainted.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital or analog computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a client user device from a server device, geographic map data in an interactive mapping system;
   processing, at the client user device, a set of one or more vertices, where the vertices define a vector graphic, where each vertex defines a map location corresponding to geographic map coordinates;
   for one or more portions of the vector graphic that coincide with a user viewport, generating one or more respective vector tiles for display at the client user device using the vertices, where a vector tile is a portion of the vector graphic, and where the user viewport defines a first region in which geographic map coordinates can be displayed;
   receiving a command from a user of the interactive mapping system, where the command directs the user viewport to transition from the first region to a second region; and
   generating one or more new vector tiles at the client user device using the vertices for respective new portions of the vector graphic that coincide with the user viewport at the second region, where the respective new portions did not previously coincide with the user viewport at the first region, wherein vector tiles that coincide with the user viewport at the second region and the user viewport at the first region, and were previously generated for the user viewport at the first region, are reused for display within the user viewport at the second region.

2. The method of claim 1, where the vector graphic is a polyline.

3. The method of claim 1, where the vector graphic is a polygon.

4. The method of claim 1, further comprising:
   releasing one or more old vector tiles at the client user device, where the old tiles previously coincided with the user viewport at the first region and do not coincide with the user viewport at the second region.

5. The method of claim 4, where releasing the one or more old vector tiles comprises reallocating memory previously used to generate the one or more old vector tiles.

6. The method of claim 4, where releasing the one or more old vector tiles comprises removing the old vector tiles from a rendering process.

7. The method of claim 1, where the vector graphic coincides with the user viewport if the vector graphic is overlapped by the user viewport.

8. The method of claim 1, where the vector graphic coincides with the user viewport if the vector graphic intersects a region defined by the user viewport.

9. The method of claim 2, where generating the portions of the vector graphic further comprises:
   computing a level of detail for each vertex; and
   removing vertices that do not meet the level of detail.

10. The method of claim 9, where the level of detail is computed by using a median simplification tolerance.

11. The method of claim 10, where computing the level of detail comprises:
    for each level of detail:
      selecting one or more random vertices from one or more vertices remaining in the vector graphic;
      for each random vertex:
        calculating an error value resulting from removing the respective vertex; and
        selecting a median of the error values as a simplification tolerance; and
      for each vertex remaining in the set of vertices of the vector graphic:
        calculating an error value resulting from removing the respective vertex; and
        removing the vertex from the set of vertices if the error value is less than the simplification tolerance.

12. The method of claim 2, where the polyline is a geodesic polyline.

13. The method of claim 12, where the polyline is generated by using a recursive bisection procedure.

14. The method of claim 13, where the recursive bisection procedure comprises:
for each edge:
computing a linear midpoint of the edge;
computing a geodesic midpoint of the edge;
rendering the edge as a straight line if the geodesic midpoint is within a predetermined number of pixels of the linear midpoint; and
if the geodesic midpoint is not within the predetermined number of pixels of the linear midpoint, introducing the geodesic mid-point as a vertex in the vector graphic.

15. A system comprising:
one or more computers; and
a non-transitory computer readable storage device storing instructions that, when executed by the one or more computers, cause the one or more computers to perform operations comprising:
receiving, at a client user device from a server device, geographic map data in an interactive mapping system;
processing, at the client user device, a set of one or more vertices, where the vertices define a vector graphic, where each vertex defines a map location corresponding to geographic map coordinates;
for one or more portions of the vector graphic that coincide with a user viewport, generating one or more respective vector tiles for display at the client user device using the vertices, where a vector tile is a portion of the vector graphic, and where the user viewport defines a first region in which geographic map coordinates can be displayed;
receiving a command from a user of the interactive mapping system, where the command directs the user viewport to transition from the first region to a second region; and
generating one or more new vector tiles at the client user device using the vertices for respective new portions of the vector graphic that coincide with the user viewport at the second region, where the respective new portions did not previously coincide with the user viewport at the first region, wherein vector tiles that coincide with the user viewport at the second region and the user viewport at the first region, and were previously generated for the user viewport at the first region, are reused for display within the user viewport at the second region.

16. The system of claim 15, where the vector graphic is a polyline.

17. The system of claim 15, where the vector graphic is a polygon.

18. The system of claim 15, where the operations further comprise:
releasing one or more old vector tiles at the client user device, where the old tiles previously coincided with the user viewport at the first region and do not coincide with the user viewport at the second region.

19. The system of claim 18, where releasing the one or more old vector tiles comprises reallocating memory previously used to generate the one or more old vector tiles.

20. The system of claim 18, where releasing the one or more old vector tiles comprises removing the old vector tiles from a rendering process.

21. The system of claim 15, where the vector graphic coincides with the user viewport if the vector graphic is overlapped by the user viewport.

22. The system of claim 15, where the vector graphic coincides with the user viewport if the vector graphic intersects a region defined by the user viewport.

23. The system of claim 16, where generating the portions of the vector graphic further comprises:
computing a level of detail for each vertex; and
removing vertices that do not meet the level of detail.

24. The system of claim 23, where the level of detail is computed by using a median simplification tolerance.

25. The system of claim 24, where computing the level of detail comprises:
for each level of detail:
selecting one or more random vertices from one or more vertices remaining in the vector graphic;
for each random vertex:
calculating an error value resulting from removing the respective vertex; and
selecting a median of the error values as a simplification tolerance; and
for each vertex remaining in the set of vertices of the vector graphic:
calculating an error value resulting from removing the respective vertex; and
removing the vertex from the set of vertices if the error value is less than the simplification tolerance.

26. The system of claim 16, where the polyline is a geodesic polyline.

27. The system of claim 26, where the polyline is generated by using a recursive bisection procedure.

28. The system of claim 27, where the recursive bisection procedure comprises:
for each edge:
computing a linear midpoint of the edge;
computing a geodesic midpoint of the edge;
rendering the edge as a straight line if the geodesic midpoint is within a predetermined number of pixels of the linear midpoint; and
if the geodesic midpoint is not within the predetermined number of pixels of the linear midpoint, introducing the geodesic mid-point as a vertex in the vector graphic.

29. A non-transitory computer-readable storage device having stored thereon instructions, which, when executed by a computer, cause the computer to perform operations comprising:
receiving, at a client user device from a server device, geographic map data in an interactive mapping system;
processing, at the client user device, a set of one or more vertices, where the vertices define a vector graphic, where each vertex defines a map location corresponding to geographic map coordinates;
for one or more portions of the vector graphic that coincide with a user viewport, generating one or more respective vector tiles for display at the client user device using the vertices, where a vector tile is a portion of the vector graphic, and where the user viewport defines a first region in which geographic map coordinates can be displayed;
receiving a command from a user of the interactive mapping system, where the command directs the user viewport to transition from the first region to a second region; and
generating one or more new vector tiles at the client user device using the vertices for respective new portions of the vector graphic that coincide with the user viewport at the second region, where the respective new portions did not previously coincide with the user viewport at the first region, wherein vector tiles that coincide with the user viewport at the second region and the user viewport at the first region, and were previously generated for the user viewport at the first region, are reused for display within the user viewport at the second region.

30. The computer-readable storage device of claim 29, where the vector graphic is a polyline.

31. The computer-readable storage device of claim 29, where the vector graphic is a polygon.

32. The computer-readable storage device of claim 29, where the operations further comprise:
   releasing one or more old vector tiles at the client user device, where the old tiles previously coincided with the user viewport at the first region and do not coincide with the user viewport at the second region.

33. The computer-readable storage device of claim 32, where releasing the one or more old vector tiles comprises reallocating memory previously used to generate the one or more old vector tiles.

34. The computer-readable storage device of claim 32, where releasing the one or more old vector tiles comprises removing the old vector tiles from a rendering process.

35. The computer-readable storage device of claim 29, where the vector graphic coincides with the user viewport if the vector graphic is overlapped by the user viewport.

36. The computer-readable storage device of claim 29, where the vector graphic coincides with the user viewport if the vector graphic intersects a region defined by the user viewport.

37. The computer-readable storage device of claim 30, where generating the portions of the vector graphic further comprises:
   computing a level of detail for each vertex; and
   removing vertices that do not meet the level of detail.

38. The computer-readable storage device of claim 37, where the level of detail is computed by using a median simplification tolerance.

39. The computer-readable storage device of claim 38, where computing the level of detail comprises:
   for each level of detail:
      selecting one or more random vertices from one or more vertices remaining in the vector graphic;
   for each random vertex:
      calculating an error value resulting from removing the respective vertex; and
      selecting a median of the error values as a simplification tolerance; and
   for each vertex remaining in the set of vertices of the vector graphic:
      calculating an error value resulting from removing the respective vertex; and
      removing the vertex from the set of vertices if the error value is less than the simplification tolerance.

40. The computer-readable storage device of claim 30, where the polyline is a geodesic polyline.

41. The computer-readable storage device of claim 40, where the polyline is generated by using a recursive bisection procedure.

42. The computer-readable storage device of claim 41, where the recursive bisection procedure comprises:
   for each edge:
      computing a linear midpoint of the edge;
      computing a geodesic midpoint of the edge;
      rendering the edge as a straight line if the geodesic midpoint is within a predetermined number of pixels of the linear midpoint; and
      if the geodesic midpoint is not within the predetermined number of pixels of the linear midpoint, introducing the geodesic mid-point as a vertex in the vector graphic.

* * * * *